United States Patent
Schmid et al.

(10) Patent No.: US 7,866,555 B2
(45) Date of Patent: Jan. 11, 2011

(54) TRANSPORT MONITORING SYSTEM

(75) Inventors: Rolf Hermann Schmid, Ulm (DE); Hartmut Feuchtmueller, Langenau (DE); Matthias Epple, Ulm (DE); Alfred Rampf, Blaustein (DE); Hans-Juergen Neuerburg, Sankt Augustin (DE)

(73) Assignee: Deutsche Telekom AG, Bonn (DE)

( * ) Notice: Subject to any disclaimer, the term of this patent is extended or adjusted under 35 U.S.C. 154(b) by 502 days.

(21) Appl. No.: 11/813,373

(22) PCT Filed: Oct. 7, 2005

(86) PCT No.: PCT/DE2005/001791
§ 371 (c)(1),
(2), (4) Date: May 5, 2008

(87) PCT Pub. No.: WO2006/072225
PCT Pub. Date: Jul. 13, 2006

(65) Prior Publication Data
US 2009/0026263 A1    Jan. 29, 2009

(30) Foreign Application Priority Data
Jan. 7, 2005    (DE) .................. 10 2005 001 034

(51) Int. Cl.
*G06F 19/00* (2006.01)
(52) U.S. Cl. ................. 235/385; 235/375; 235/383; 340/572.1; 705/28
(58) Field of Classification Search ............. 235/383, 235/384, 385, 375; 340/572.1, 988, 989; 705/28, 29
See application file for complete search history.

(56) References Cited

U.S. PATENT DOCUMENTS

| 5,117,096 | A  | * | 5/1992  | Bauer et al. ............... 235/375 |
| 6,459,367 | B1 | * | 10/2002 | Green et al. .............. 340/440 |
| 6,827,256 | B2 |   | 12/2004 | Stobbe et al. |
| 2002/0017990 | A1 |  | 2/2002 | Okamura |
| 2002/0089434 | A1 | * | 7/2002 | Ghazarian ............... 340/988 |
| 2004/0069850 | A1 | * | 4/2004 | De Wilde ................. 235/385 |
| 2004/0246104 | A1 | * | 12/2004 | Baechtiger et al. ....... 340/10.41 |
| 2005/0222723 | A1 | * | 10/2005 | Estes et al. .............. 701/33 |

(Continued)

FOREIGN PATENT DOCUMENTS

CA    2411395    4/2004

(Continued)

*Primary Examiner*—Thien M. Le
*Assistant Examiner*—Tuyen K Vo
(74) *Attorney, Agent, or Firm*—Leydig, Voit & Mayer, Ltd.

(57) ABSTRACT

A transport monitoring system is provided for transporting goods that are provided with identification tags. The identification tags store identification data used to identify the goods. The transport device includes a closeable transport unit, at least one reader unit, an evaluation unit and activation unit. The closeable transport unit receives goods that are provided with identification tags. The at least one reader unit emits an inquiry signal to the transport unit in order to read the identification tags when an activation signal for activating the reader unit is received. The at least one reader unit also receives the identification data signals emitted by the identification tags. The evaluation unit is used to evaluate the identification data signals received by the reader unit. The activation unit produces the activating signal for activating the reader unit once the transport unit is closed.

24 Claims, 9 Drawing Sheets

U.S. PATENT DOCUMENTS

2006/0011721 A1* 1/2006 Olsen et al. .................. 235/385
2006/0091206 A1* 5/2006 Olsen et al. .................. 235/384

FOREIGN PATENT DOCUMENTS

| DE | 3942009 | 7/1991 |
| DE | 19844631 | 4/2000 |
| DE | 10042150 | 3/2002 |
| DE | 10044658 | 3/2002 |
| DE | 10113072 | 10/2002 |
| DE | 102004016548 | 10/2005 |
| EP | 1406207 | 4/2004 |
| WO | 03015039 | 2/2003 |
| WO | 03023439 | 3/2003 |

* cited by examiner

Transport Schedule

| Waypoint | Coordinates | Sensor Data | Time |
|---|---|---|---|
| Waypoint 0 | $x_0\ y_0\ z_0$ | $S_{01}\ S_{02}\ ...\ S_{0M}$ | $t_0 \pm \Delta t_0$ |
| Waypoint 1 | $x_1\ y_1\ z_1$ | $S_{11}\ S_{12}\ ...\ S_{1M}$ | $t_1 \pm \Delta t_1$ |
| . | . | . | . |
| . | . | . | . |
| . | . | . | . |
| Waypoint N | $x_N\ y_N\ z_N$ | $S_{N1}\ S_{N2}\ ...\ S_{NM}$ | $t_N \pm \Delta t_N$ |

Fig. 7a

| Waypoint | Coordinates | Door | Temperature | Time |
|---|---|---|---|---|
| Munich | $x_M\ y_M\ z_M$ | zu | 30° | $14^{00} \pm 30m$ |
| Frankfurt | $x_F\ y_F\ z_F$ | zu | 25° | $18^{00} \pm 1h$ |
| Hamburg | $x_{HH}\ y_{HH}\ z_{HH}$ | zu | 25° | $22^{00} \pm 1h$ |

Fig. 7b

TRANSPORT MONITORING SYSTEM

CROSS REFERENCE TO RELATED APPLICATIONS

This is a U.S. national phase application under 35 U.S.C. §371 of International Patent Application No. PCT/DE2005/001791, filed Oct. 7, 2005, and claims benefit of German Patent Application No. 10 2005 001 034.2, filed Jan. 7, 2005. The International Application was published in German on Jul. 13, 2006 as WO 2006/072225 under PCT Article 21(2).

The present invention relates to a transport device for transporting goods, a method for tracking a flow of transported goods, and a transport monitoring system for monitoring a flow of goods.

BACKGROUND

The monitoring of flow of goods is becoming increasingly important, first of all because the volume of transported goods is constantly increasing worldwide, and secondly because it is essential to deliver goods, especially industrial goods, to their destinations precisely in time for further processing according to the so-called just-in-time concepts. Because of the increasing complexity and increasing volume of the flow of goods, the logistic monitoring thereof is becoming increasingly important.

FIG. 1 shows a prior art transport monitoring system, where goods are transported from a warehouse A to a warehouse B. The goods W are provided with so-called tags T for transport monitoring purposes. Tags are identification elements which include a carrier, such as an article label, and a small transponder chip. RFID (radio frequency identification) chips are known, a distinction being made between passive, semi-active and active tags. The tags serve to identify the goods on which they are provided. A reader unit, or reader, includes a receiver unit for transmitting and receiving electromagnetic waves. The emitted waves are received by a coil provided in the tags. Tags receive, from the transmitter/receiver unit of the reader, a signal pulse to send an individual response signal back to the reader.

Passive tags have no integral power supply, but absorb the energy of the emitted pulse and use the absorbed energy to generate the response signal. Passive tags, by nature, have a relatively small range.

Semi-active tags have an integral power supply, one part of the energy required for the response being supplied by the integral power supply, and another part being obtained from the signal received from the reader. The range of semi-active tags is slightly larger than that of passive tags.

Active tags also have an integral power supply, the energy for the response signal for identifying the goods being completely obtained from the integral power supply.

Active tags are irradiated by the reader with relatively low transmitted power, while passive tags are irradiated with relatively high transmitted power because they have to obtain therefrom the energy for generating the response signal. Passive tags have the advantage of not requiring an integral power supply. However, they need to be irradiated with relatively high power. On the other hand, active tags have the advantage of having to be irradiated only with relatively low transmitted power. However, there is a risk that the power supply of the active tags may fail after a certain period of time.

In the transport monitoring system illustrated in FIG. 1, the goods to be transported W are loaded from a warehouse A into a transport device, for example into a truck, through a reader unit LA. Reader unit LA identifies the goods loaded into the truck by the tags T attached to goods W. Reader unit LA has connected thereto an evaluation unit which, for example, updates the inventory list of warehouse A. The transport device; i.e., the truck, takes the goods provided with tags T to a destination warehouse B. The goods are unloaded from the truck, passed through a reader unit LB, and stored in destination warehouse B. Reader unit LB identifies the goods received into warehouse B by the tags T attached to goods W. An evaluation unit connected to reader unit LB updates the inventory of warehouse B.

The transport monitoring system shown in FIG. 1 has several disadvantages. There is a risk that goods may indeed be passed through reader unit LA, but not actually get into the truck or transport device. Goods may intentionally or unintentionally pass reader unit LA without being loaded into the truck. For example, goods W may be erroneously loaded into the wrong truck and taken to a different warehouse. Moreover, there is no monitoring of the goods while in the truck and on the transport path between the two warehouses A, B.

German Patent Application DE 19 844 631 A1 proposes a system for monitoring, controlling, tracking and handling objects, as illustrated in FIG. 2. The transport device described in DE 19 844 631 A1, which may be a truck, includes a write/read device for reading tags T, which are attached to goods W within the transport device. The reader unit, or reader, emits interrogation signals, i.e., electromagnetic signals, into the cargo space of the truck and receives identification data signals from the transponders located in the cargo space. An evaluation unit attached to the reader unit, or reader, evaluates the received identification data signals, thereby monitoring, for example, whether all loaded goods are still in the cargo space. The mobile data carriers, or tags, attached to the goods send identification data and object-specific data to the reader unit. Moreover, the tags attached to the goods send further data, such as data indicative of the temperature in the shipping container. For example, if the measured temperature exceeds or falls below a threshold value, a warning will be issued to the truck driver, who will initiate the necessary countermeasures. The transport monitoring system shown in FIG. 1, it has considerable disadvantages.

If goods are removed from the truck shown in prior art FIG. 2, for example by theft, the goods, and the tags attached thereto, get out of the transmission range of the reader, or reader unit. Therefore, in order to detect such shrinkage of goods, the reader unit must emit an interrogation signal into the cargo space of the truck, either constantly or at regular intervals (for example, every five minutes). If there is a suspicion that goods have been stolen from the cargo space, the write/read device can also be activated by the driver in order to read the tags.

A disadvantage of the transport monitoring system described in DE 19 844 631 A1 is that the use of active tags for monitoring the goods is unsafe when the interrogation signal is emitted periodically or constantly. Due to the periodic emission of the interrogation signal, a load is placed on the power supply or battery of the active tags on a regular basis, so that the battery of the active tags will gradually discharge. Once the battery of the tags is empty, the tags are unable to send an identification data signal back to the reader, which leads to unwanted, incorrect messages. If the intervals between the interrogation signals are increased, for example, to a period of 10 minutes, there is a risk of goods being stolen from the transport device in the meantime. An increase in the time period for emitting the interrogation signal does, in fact, extend the life of the active tags, but loss or theft of goods is usually detected later in time.

Another disadvantage of the conventional transport monitoring system illustrated in FIG. 2 is that the system is not secure against tapping. When write/read units emit interrogation signals into the transport device, the tags attached to the goods respond by sending identification data signals back to the reader unit. Since the identification data signals are also radiated outside the transport device, for example, to a vehicle traveling behind the truck, the emitted identification data signals enable third parties to easily identify the goods transported in the truck. Thus, third parties may find out whether it is worthwhile to steal the goods. Thus, due to the lack of security against tapping, secret transport of certain goods, for example, in a military context, cannot be reliably prevented from being noticed by third parties.

A further disadvantage of the transport device shown in FIG. 2 is that the interrogation signal emitted by the write/read unit and the identification data signals returned by the tags cause problems in terms of electromagnetic compatibility. Interrogation signals and the returned identification data signals may interfere with other electronic systems in the transport device. If the transport device is, for example, an aircraft, the periodically emitted interrogation signal and the returned identification data signals may interfere with the sensitive electronics located therein and pose a safety risk.

It is yet another disadvantage of the transport device shown in FIG. 2 that the transport monitoring system is a local system in which the driver of the transport device responds to error messages. If, for example, goods are stolen from the transport device with the aid of the driver, this cannot be detected immediately.

SUMMARY

It is an aspect of the present invention to provide a transport monitoring system in which the transport of goods is monitored over the entire transport path in a continuous manner and such that it is secure against tapping.

In an embodiment, the present invention provides a transport device for transporting goods that are provided with identification tags which store identification data for identifying the goods. The transport device includes a closable transport unit, at least one reader unit, an evaluation unit and an activation unit. The closable transport unit is configured to receive the goods including the identification tags. The at least one reader unit is configured to emit an interrogation signal for reading the identification tags into the transport unit upon receipt of an activation signal for activating the reader unit. The at least one reader unit also receives the identification data signals that are emitted by the identification tags. The evaluation unit is configured to evaluate the identification data signals received by the reader unit. The activation unit is configured to generate an activation signal after the transport unit is closed so as to activate the reader unit.

BRIEF DESCRIPTION OF THE DRAWINGS

Aspects of the present invention will now be described by way of exemplary embodiments with reference to the following drawings, in which:

FIGS. 7a and 7b show tables illustrating a transport schedule transmitted in the transport monitoring system according to an exemplary embodiment of the present invention.

DETAILED DESCRIPTION

According to an exemplary embodiment of the present invention, a transport device is provided for transporting goods that are provided with identification tags which store identification data for identifying the goods. The transport device includes: a closable transport unit for receiving the goods provided with identification tags; at least one reader unit which, upon receipt of an activation signal, emits an interrogation signal for reading the identification tags into the transport unit and which receives the identification data signals that are then emitted by the identification tags; an evaluation unit for evaluating the identification data signals received by the reader unit; an activation signal for activating the reader unit being generated by an activation unit after the transport unit is closed.

In an embodiment of the transport device according to an exemplary embodiment of the present invention, after receipt of the activation signal which is generated after the transport unit is closed, the interrogation signal for reading the identification tags is emitted into the transport unit only once, and the identification tags return the identification data signals to the reader unit only once. The activation signals are generated by an activation unit, which is preferably formed by a closed position sensor mounted on the closing device of the transport unit.

If, when loading the transport unit, it is closed by a closing device such that it is secure against burglary, the closed position sensor mounted on the closing device generates the activation signal for activating the reader unit. After that, the reader unit sends, once or a few times, an interrogation signal for reading the identification tags into the cargo space, or into the transport unit, and subsequently receives, once or a few times, the identification data signals that are returned by the identification tags and which will then be evaluated in the evaluation unit.

As long as the closed position sensor indicates that the transport unit is securely closed, the reader unit will not emit another interrogation signal into the transport unit to read the identification tags, unless the reader unit receives a different activation signal. This reliably prevents unauthorized third parties from receiving identification data signals from the transport unit while the transport device is in transit on the transport path. As long as the closing device is securely closed, it is impossible to steal the goods from the transport unit, which eliminates the need to periodically send an interrogation signal to verify that the goods are still in the transport unit. Of course, the reader unit may send an interrogation signal to the transport unit on request, either in response to an active input from the driver or when a central unit sends a corresponding activation signal to the transport device.

Figure 1:
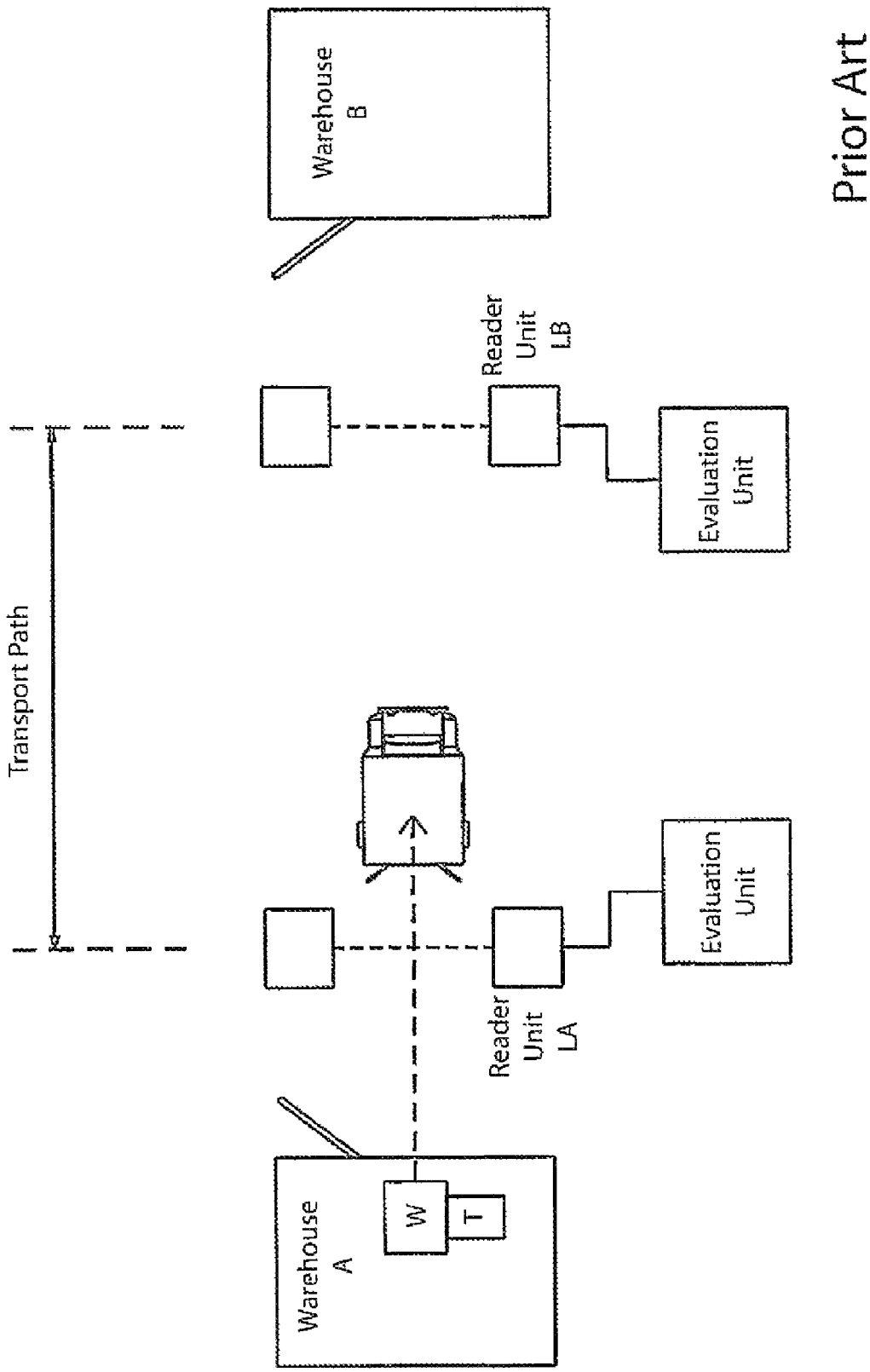
FIG. 1 shows a prior art transport monitoring system.
Figure 2:
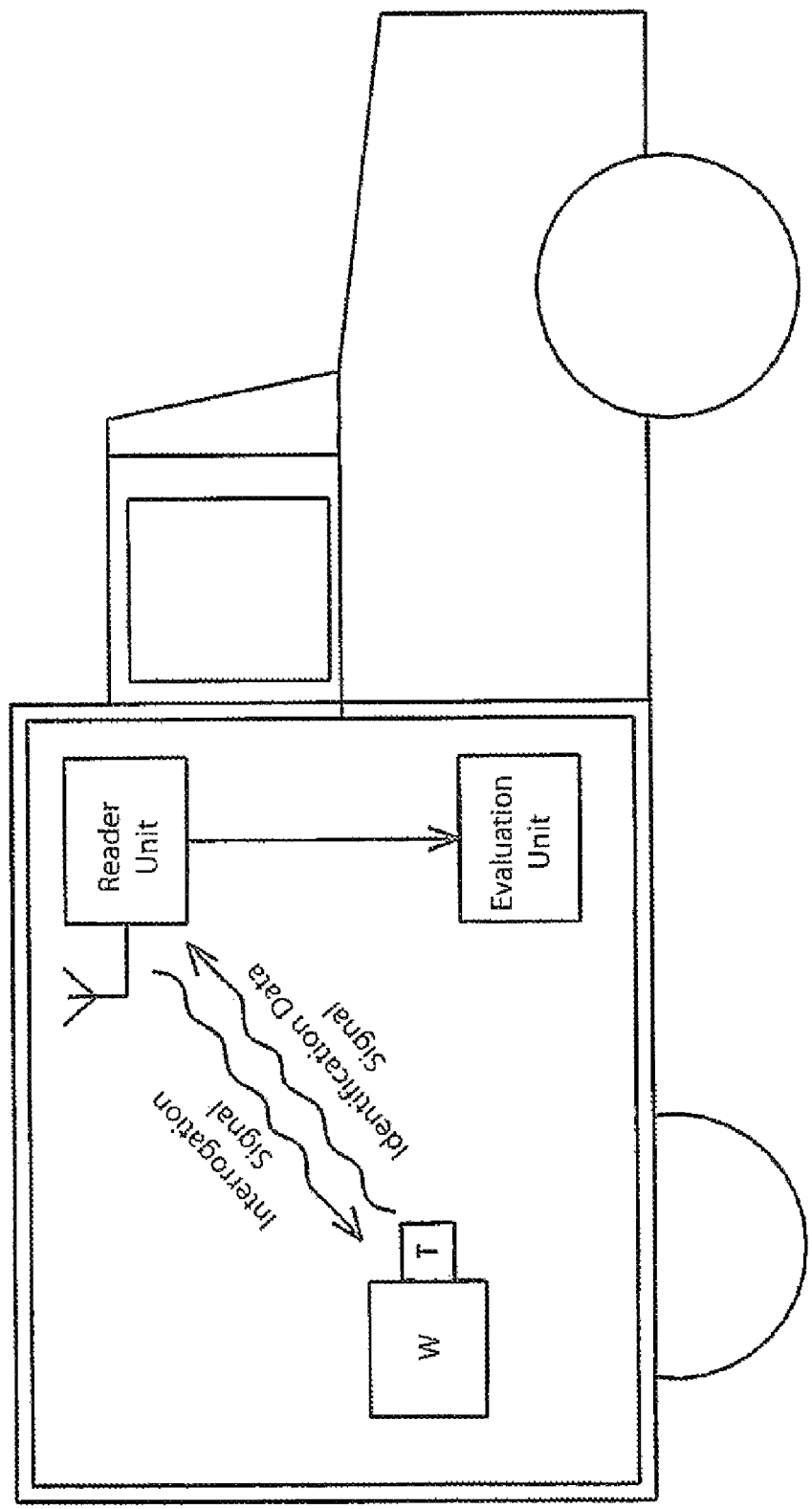
FIG. 2 shows a prior art transport device for transporting goods.

Since the tags attached to the goods receive an interrogation signal only when the goods are loaded into the transport unit and, respectively, when the goods are unloaded from the transport unit, and otherwise only in rare cases, the transport monitoring system is also suitable for goods that are provided with active tags. Because interrogation signals are received very infrequently, the battery of the tags attached to the goods lasts much longer. Active tags have the advantage of having a larger range within the cargo space. Therefore, the volume of the transport unit into which the goods are loaded can be significantly larger than in the case of the transport device illustrated in FIG. 2.

In an exemplary embodiment of the transport device according to the present invention, the transport device has a transmit/receive antenna for emitting the interrogation signal into the transport unit and for receiving the identification data signals from the identification tags. Of course, it is possible to provide a plurality of transmit/receive antennas within the transport unit, said transmit/receive antennas being connected to the reader unit.

In exemplary embodiment of the transport device according to the present invention, the evaluation unit has at least one interface for wireless data transfer.

In accordance with an exemplary embodiment, an activation signal for activating the reader unit is transmitted from a remote central unit via this interface to the evaluation unit.

The central unit sends a message for activating the reader unit while the transport device is in transit on the transport path, and receives a message including the identification data signals of the tagged goods. This allows the central unit to detect, during transport, the type and amount of goods transported in the transport device.

In an exemplary embodiment, the transport device of the present invention contains a second activation unit in the form of a speed sensor for measuring the traveling speed of the transport device; the activation signal for activating the reader unit not being generated until the traveling speed of the transport device exceeds a settable speed threshold value.

In another exemplary embodiment, the transport device according to the present invention has an additional activation unit in the form of a load sensor for sensing the load weight of the transport device; the activation signal not being generated until the load weight exceeds a settable weight threshold value.

According to an exemplary embodiment of the present invention, the transport unit preferably takes the form of a container.

In one exemplary embodiment of the transport device according to the present invention, the identification tags are active tags having an integral power supply.

In an alternative exemplary embodiment of the transport device according to the present invention, the identification tags are passive tags without an integral power supply.

In an exemplary embodiment of the transport device according to the present invention, the identification tags attached to the goods are all provided with RFID transponders. These RFID transponders are preferably attached to an article label.

In accordance with an exemplary embodiment of the transport device of the present invention, the transport device has condition sensors for determining the condition of the goods in transit, said condition sensors being connected to the evaluation unit. The condition sensors preferably include temperature sensors for measuring the temperature within the transport unit. The condition sensors may also preferably include speed sensors for measuring a traveling speed of the transport device. The condition sensors may also preferably include acceleration sensors for measuring the acceleration of the transport device.

In an exemplary embodiment, the transport device according to the present invention is a motor vehicle, such as a truck. Preferably, the motor vehicle has provided therein condition sensors which are connected to the evaluation unit and used for determining the condition of the goods being transported in the motor vehicle. In a particularly preferred exemplary embodiment, the condition sensors include tire pressure sensors for measuring the pressure in tires of the motor vehicle.

The evaluation unit of the transport device of the present invention preferably includes an interface to the reader unit and a processor for processing the identification data signals received by the reader unit.

In an exemplary embodiment, the evaluation unit further includes an interface for connecting condition sensors and an interface for connecting an activation unit.

In accordance with an exemplary embodiment, the evaluation unit of the inventive transport device further includes a GSM unit for exchanging messages with a central unit.

In an exemplary embodiment of the transport device according to the present invention, the evaluation unit additionally includes a GPS unit for determining the position of the transport device.

The present invention also includes a method for tracking a flow of goods, including the following steps: providing the goods with identification tags which store identification data and serve to identify the goods; transporting the goods in a transport unit; activating a reader unit by an activation signal to emit, into the transport unit, an interrogation signal which reads the identification data stored in the identification tags, the activation signal for activating the reader unit being generated by an activation unit after the transport unit is closed; receiving, by the reader unit, the identification data signals emitted by the identification tags that have been read; and evaluating the identification data signals received by the reader unit.

The present invention further provides a transport monitoring system for monitoring a flow of goods where the transport monitoring system includes a plurality of transport devices as described above, and further including at least one central unit which exchanges messages with the transport devices via an interface.

Figure 3:
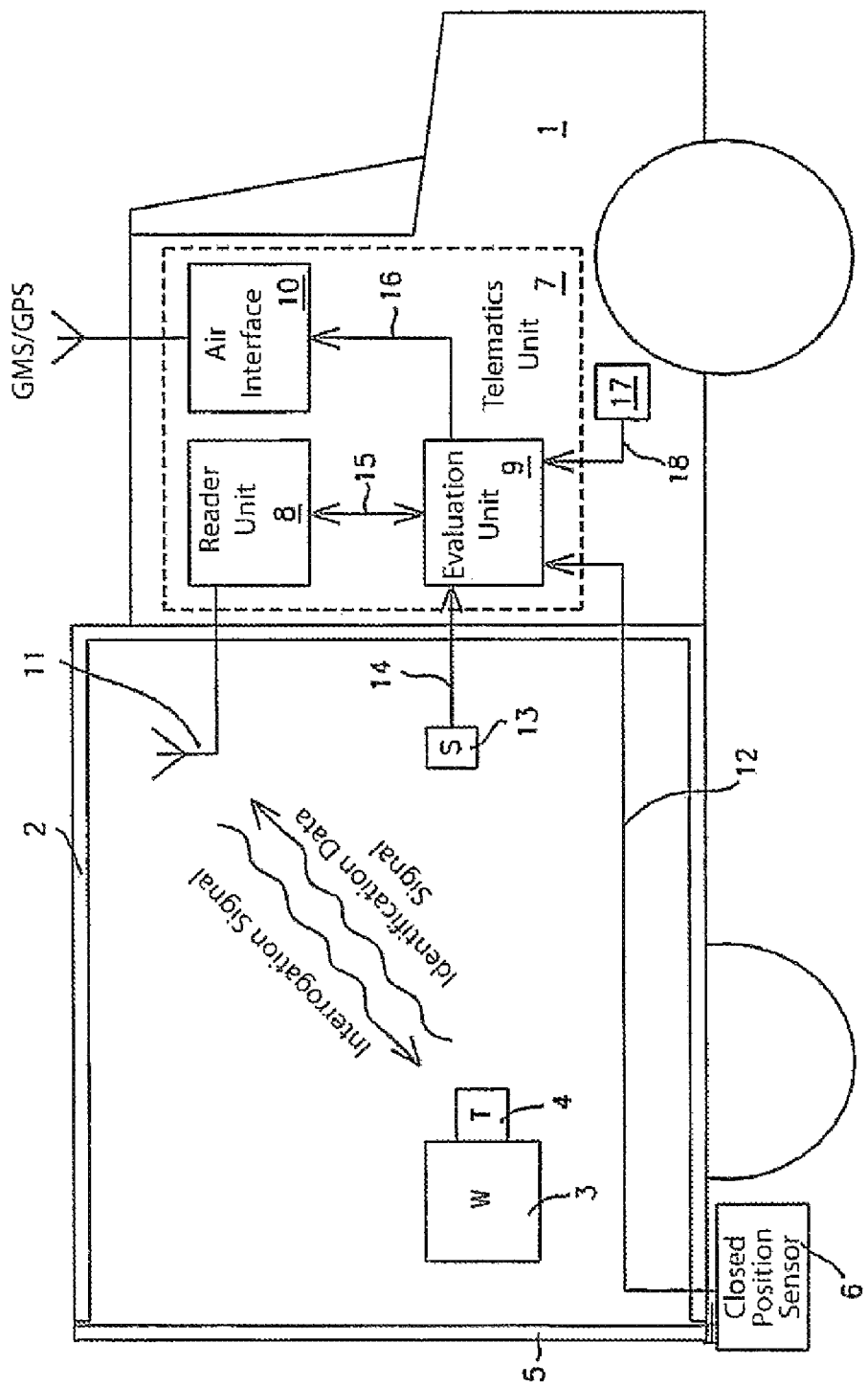
FIG. 3 shows a transport device for transporting goods in accordance with a preferred exemplary—global embodiment of the present invention.

As can be seen from FIG. 3, a transport device 1 for transporting goods, in the exemplary embodiment shown, includes a transport unit 2 for receiving goods 3 which are all provided with identification tags 4. Transport device 1 shown in FIG. 3 is a truck. In this case, transport unit 2 is formed by the cargo space of the truck.

In other exemplary embodiments, transport unit 2 may be a freight car of a train, or an automotive trailer. In alternative embodiments, transport unit 2 may also be a shipping container in a ship or in an aircraft. Preferably, transport unit 2 is securely closable by a door 5. A closed position sensor 6 mounted on the closing device detects whether transport unit 2 is closed. Transport device 1 includes an integrated telematics unit 7. Preferably, telematics unit 7 is also permanently integrated into transport unit 2 and preferably has a rigid housing, which protects telematics unit 7 from tampering.

In the exemplary embodiment shown in FIG. 3, telematics unit 7 includes a reader unit 8, an evaluation unit 9, and an air interface 10. In alternative embodiments, reader unit 8 and air interface 10 are not integrated into telematics unit 7. Reader unit 8 has connected thereto at least one transmit/receive antenna 11, which is located inside transport unit 2. Transmit/ receive antenna 11 can be used to emit an interrogation signal into transport unit 2 and to receive identification data signals emitted by identification tags 4 inside transport unit 2.

In the embodiment shown in FIG. 3, closed position sensor 6 is connected to evaluation unit 9 via a line 12. In a preferred embodiment, line 12 is routed within transport device 1 in a tamper-proof manner. Preferably, in addition, a condition sensor 13 is connected to evaluation unit 9 via a line 14. Condition sensor 13 is also disposed within transport unit 2. Condition sensors 13 are used to determine the condition of the goods being transported within transport unit 2. In order to transport goods, transport unit 2 is loaded at the loading site. To this end, transport unit 2 is opened by door 5, and closed position sensor 6 indicates to telematics unit 7 that transport unit 2 is now open. Goods 3, which are provided with identification tags 4, are loaded into transport unit 6, after which door 5 is locked. Once closed position sensor 6 detects that door 5 is securely locked, it sends an activation signal via line 12 to evaluation unit 9, or directly to reader unit 8 in order to activate it. Reader unit 8 is connected via lines 15 to evaluation unit 9. After evaluation unit 9 receives the activation signal from closed position sensor 6, it activates reader unit 8, whereupon the reader unit emits an interrogation signal for reading identification tags 4 into the cargo space enclosed by transport unit 2. Tags 4, which receive the interrogation signal, send identification data signals back to transmit/receive antenna 11 of reader unit 8, the reader unit delivering the received identification data signals via line 15 to evaluation unit 9 for evaluation.

The interrogation signal for reading tags 4 is not emitted until transport unit 2 is securely closed, i.e., not until there is no more change to the quantity and type of goods within transport unit 2. Therefore, in order to determine and/or monitor the quantity and type of goods within transport unit 2, reader unit 8 of the inventive transport device 1 needs to emit an interrogation signal only once. After the identification data signals have been received and forwarded to evaluation unit 9, reader unit 8 no longer emits any interrogation signal into the cargo space, unless reader unit 8 receives another activation signal. In the exemplary embodiment shown in FIG. 3, evaluation unit 9 is connected via a line 16 to an air interface 10. Air interface 10 is an interface for wireless data transfer with a remote central unit. In accordance with a preferred embodiment, the central unit transmits messages to the inventive transport device 1, if necessary. The messages may include an activation signal for activating reader unit 8. In this manner, the quantity and type of goods within transport unit 2 can be determined, if necessary.

After transport unit 2 is loaded, evaluation unit 9 evaluates the received identification data signals and sends, for example, an inventory list showing the quantity and type of goods currently present in transport device 1, via air interface 10 to a remote central unit. Unless the central unit sends a further activation signal, no further interrogation signal is emitted by reader unit 8 into the cargo space.

Thus, while transport device 1 is in transit on the transport path, it is impossible for third parties to intercept further identification data signals, so that third parties are unable to identify the goods located in transport device 1. For example, in a case where transport unit 2 is located in an aircraft, it can be ensured that no interrogation signals are emitted into the cargo space of the aircraft during transport in the air. This prevents identification data signals from being emitted during transport in the air, and from interfering with other electronic systems of the aircraft. Evaluation unit 9 may receive activation signals from other sensors. For example, the embodiment shown in FIG. 3 is additionally provided with a speed sensor which is used to measure the traveling speed of transport device 1. In this case, the reading of tags 4 is not initiated until transport device 1 exceeds a settable speed threshold value. For example, the quantity and type of goods within transport unit 2 is not determined until the truck exceeds a speed of 10 km/h as it departs.

Additional activation units are provided, for example, in the form of additional load sensors for sensing a load weight of transport device 1. The load sensor generates an activation signal when the load weight of transport device 1 exceeds a settable weight threshold value. In any case, depending on the requirements, reader unit 8 does not automatically emit interrogation signals via transmit/receive antenna 11 into the cargo space of transport unit 2 at specific time intervals. The activation signals generated by the various activation units can, of course, be logically combined by a combinational logic device (not shown) within evaluation unit 9. For example, an interrogation signal is not generated until door 5 is securely closed and the starting speed is above 10 km/h.

The identification tags 4 attached to goods 3 are either active tags having an integral power supply, or passive tags which do not have an integral power supply. Identification tags 4 preferably have an RFID transponder, which is preferably attached to an article label.

As is shown in FIG. 3, evaluation unit 9 is preferably connected to at least one condition sensor 13. In a preferred embodiment, transport unit 2 has provided therein temperature sensors for measuring the inside temperature within transport unit 2. If, for example, the goods 3 are perishable food products, temperature sensors can be used to determine whether the interior space of transport unit 2 is at the desired cool temperature. Once the temperature exceeds a certain threshold value and evaluation unit 9 detects this, evaluation unit 9 sends an alarm signal via air interface 10 to the central unit and, as the case may be, a warning signal to the driver of transport device 1.

It is possible to provide a plurality of different condition sensors 13 in transport unit 2. Further, in preferred embodiments of transport device 1, additional sensors may be provided for determining the condition of transport device 1 itself. As is shown in FIG. 3, a condition sensor 17 is connected via a line 18 to evaluation unit 9. Condition sensor 17 can be, for example, a speed sensor for measuring the traveling speed of transport device 1. Condition sensor 17 may alternatively be an acceleration sensor for measuring the acceleration of transport device 1. Transport device 1 may be any transport device, such as a vehicle, a train, an aircraft, or a ship. Sensor 17 is, for example, a tire pressure sensor for measuring the pressure in the tires of motor vehicle 1.

Figure 4:
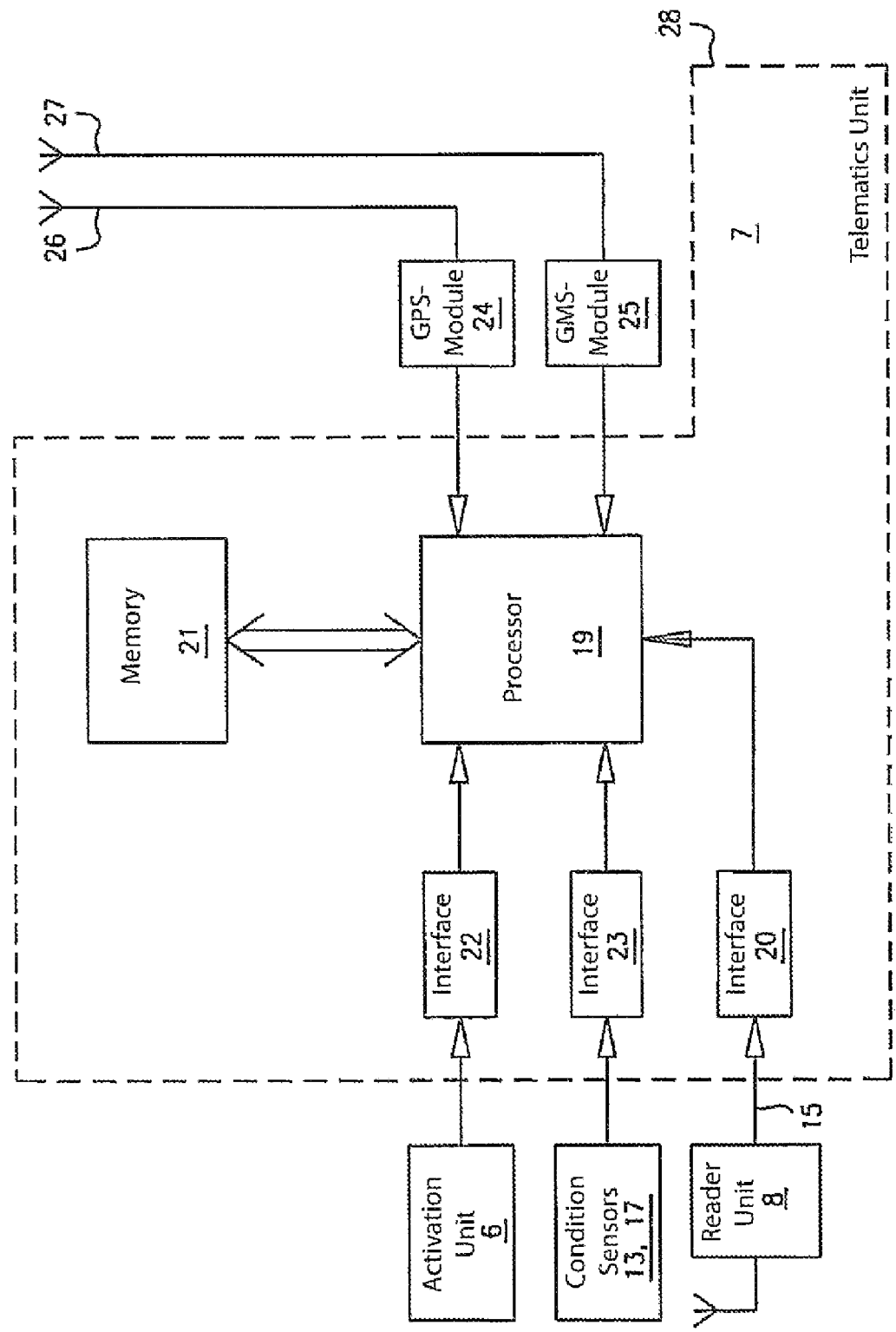
FIG. 4 shows a block diagram of a telematics unit provided in the transport device according to an exemplary embodiment of the present invention.

FIG. 4 shows a block diagram of an exemplary embodiment of the telematics unit 7 within transport device 1. In the exemplary embodiment shown in FIG. 4, telematics unit 7 includes a processor 19 for processing the identification data signals received by reader unit 8. Reader unit 8 is connected to processor 19 via an interface 20 of telematics unit 7. Telematics unit 7 preferably has a memory 21 for storing data. Activation unit 6, which may be in the form of a closed position sensor, is connected to processor 19 of telematics unit 7 via a further interface 22. Condition sensors 13, 17 are connected to processor 19 via further interfaces 23 of telematics unit 7. Also connected to processor 19 are a GPS module 24 and a GSM module 25. GPS module 24 receives, via an antenna 26, position data indicative of the position of transport device 1. Via GSM module 25 and transmit/receive antenna 27 connected thereto, processor 19 preferably exchanges message packets with a remote central unit. GSM module 25 and transmit/receive antenna 27 together form a wireless air interface 10, such as is shown in FIG. 3. Telematics unit 7 is supplied with power by an integral power supply or battery, for example by the vehicle battery of truck 1. Preferably, telematics unit 7 is integrated in a housing 28 which protects telematics unit 7 from tampering.

Figure 5:
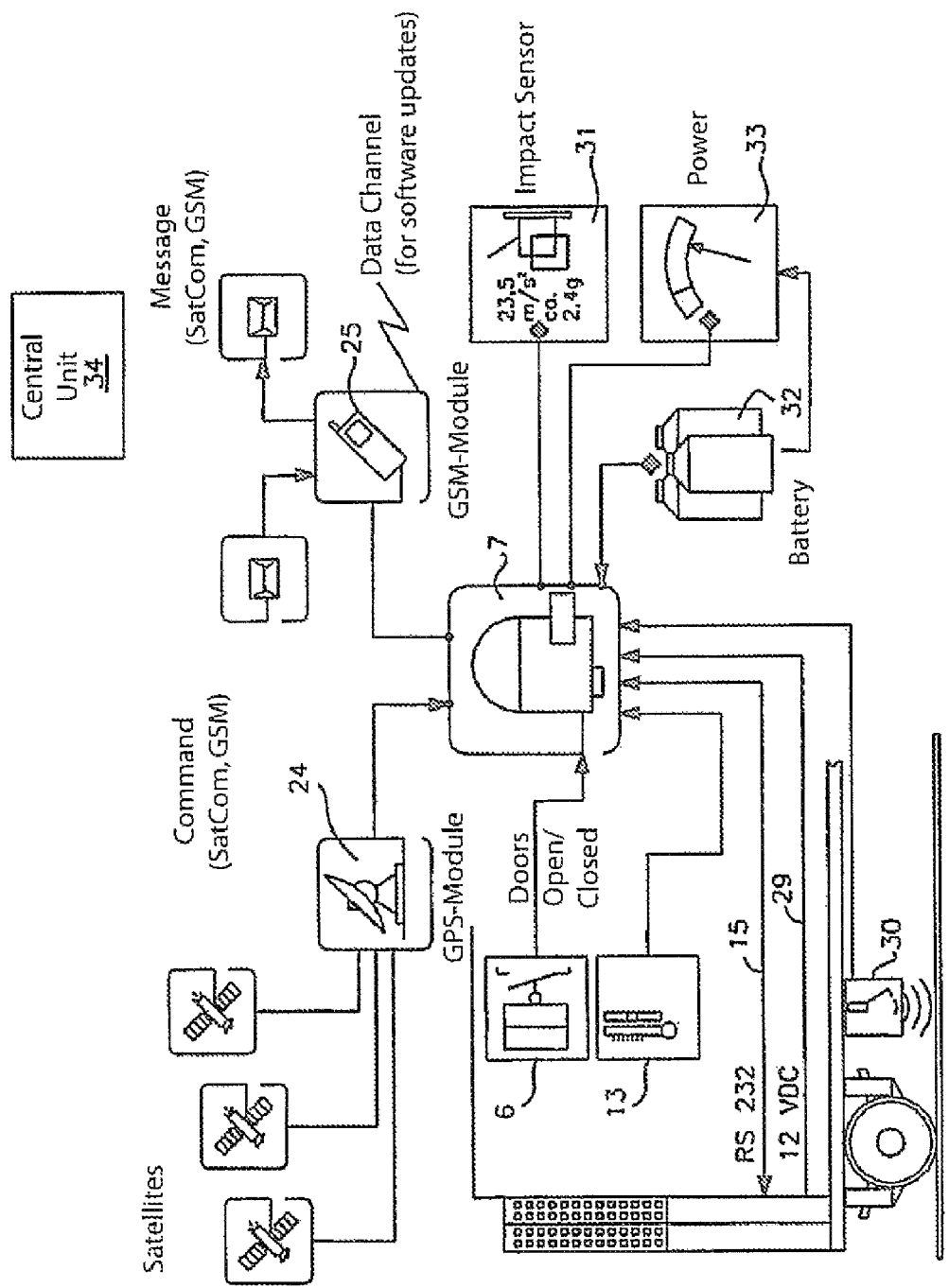
FIG. 5 shows the condition sensors provided in the transport device according to an exemplary embodiment of the present invention.

FIG. 5 schematically shows the interconnection of the inventive telematics unit 7 within a truck 1.

Via GPS module 24 connected to processor 19, said processor receives from satellites the position data or coordinates of transport device 1. Via GSM module 25, processor 19 receives messages or commands from a remote central unit 34. On the other hand, processor 19 can send signals or messages to remote central unit 34. Closed position sensor 6 indicates to processor 19 whether door 5 of transport unit 2 is securely closed.

A temperature sensor 13 provided within transport unit 2 sends to processor 19 data indicative of the temperature within the cargo space. Processor 19 is connected to a reader unit 8 via a RS232 serial interface, and receives a voltage of, for example, 12 volts from an integral power supply via a power supply line 29. Additional sensors in the form of, for example, load sensors 30 and an impact sensor 31, are connected to telematics unit 7. Further, telematics unit 7 is powered by a battery 32 of transport device 1, a sensor 33 monitoring the charge condition of battery 32. This allows for early detection of whether the charge condition of battery 32 becomes critical with respect to the power supply to telematics unit 7. The corresponding alarm signal can be sent by telematics unit 7 to remote central unit 34.

The occurrence of an unexpected event, such as an unscheduled opening of transport unit 2, exceeding or falling below a predetermined temperature, a critical charge condition of battery 32, a violent impact of transport device 1, especially one caused by an accident or the like, causes telematics unit 7 to send an alarm signal via GSM module 25 to remote central unit 34, which can then initiate suitable countermeasures or instruct the driver of transport device 1 accordingly. The consignees at the destination can be informed early of the delayed receipt of the goods. The data exchange between telematics unit 7 and remote central unit 34 can be accomplished, for example, via GSM, WLAN, Bluetooth, LAN or SAT-COM, or other suitable transmission protocols.

Figure 6:
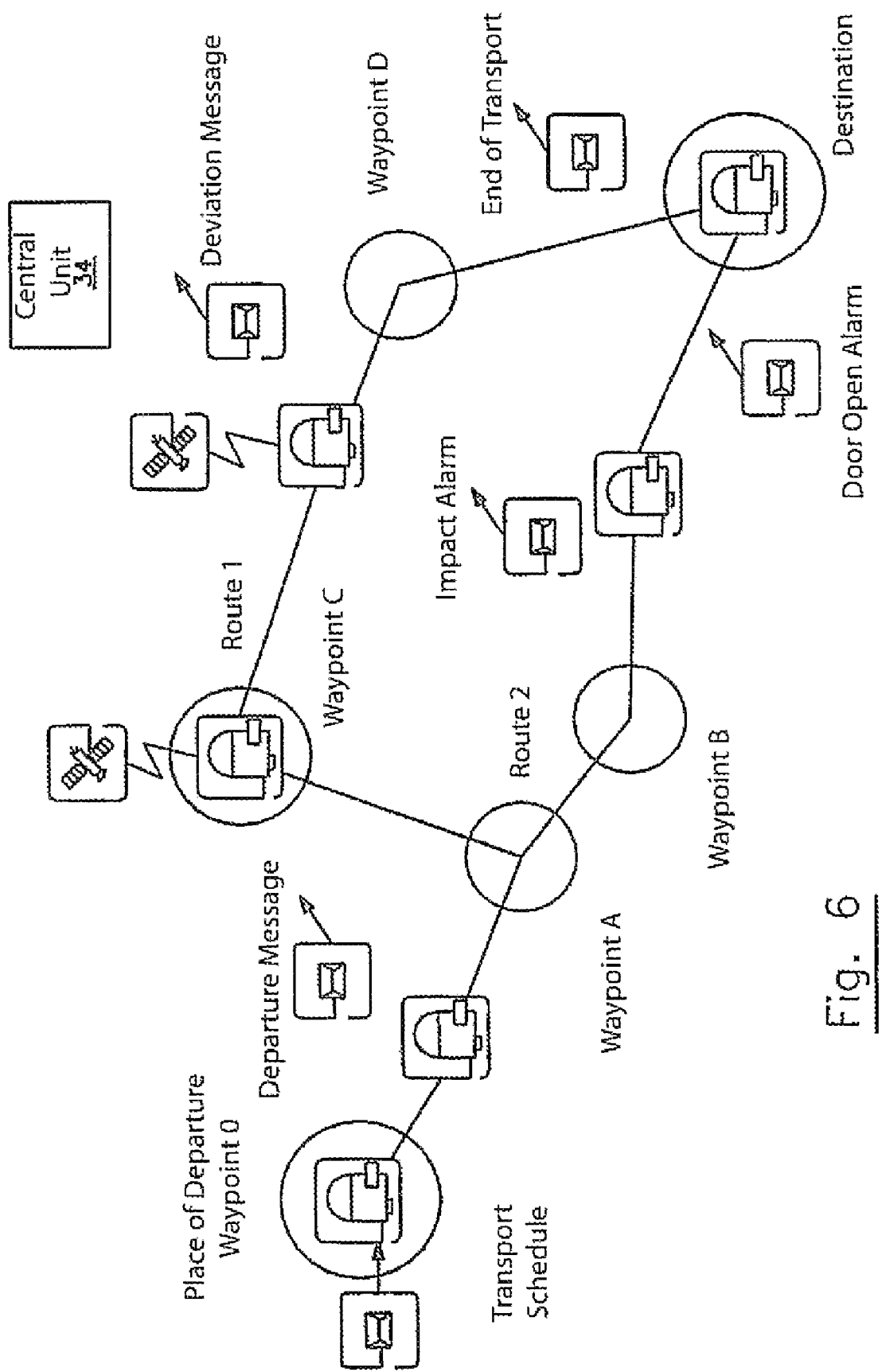
FIG. 6 shows a diagram illustrating the operating principle of the transport monitoring system according to an exemplary embodiment of the present invention.

FIG. 6 shows a diagram to illustrate the operating principle of the transport monitoring system according to the present invention. In the example shown in FIG. 6, goods can be transported by a transport device 1 from a place of departure to a destination. First, transport device 1 is loaded at the place of departure, which is located at a predefined waypoint 0 specified in a transport schedule. Central unit 34 sends the transport schedule to telematics unit 7 of transport device 1 via a wireless data link, for example via the GSM interface. FIGS. 7a, 7b show examples of such a transport schedule.

Goods 3 are loaded into transport unit 2 of transport device 1, and after transport unit 2 is closed, reader unit 8 transmits the interrogation signal into the cargo space. The goods 3 loaded in transport unit 2 are identified by the identification data signals, and telematics unit 7 sends, for example, an inventory list to remote central unit 34. Once transport device 1 starts moving, a departure message, for example, is sent to central unit 34.

At the beginning of the transport, telematics unit 7 receives from central unit 34 a defined transport schedule, such as is illustrated in FIGS. 7a, 7b. The transport schedule includes a plurality of defined waypoints 0, 1, 2, ..., N, for example up to 99 waypoints (N=99). A complete sensor configuration in the form of sensor data is specified for each waypoint. Moreover, a tolerance range in the form of a time window can optionally be defined for each waypoint and its associated position coordinates. Transport device 1 is expected to be at waypoint i=0, ..., N at a time $t_i \pm \Delta t_i$. Sensor data S indicates the desired condition at the respective waypoint.

FIG. 7b shows a simple example of a transport schedule. The cargo is to be transported from Munich via Frankfurt to Hamburg, and the door is to remain closed over the entire distance traveled. After loading, the room temperature within transport unit 2 is to be lowered in order to cool the goods, and is not to exceed 25° C. when approaching Frankfurt. The transport is to start from Munich at 14 hours ±30 minutes. According to the transport schedule, transport device 1 is to reach Hamburg at 22 hours ±1 hour. If the sensor data deviates from the desired reference sensor data at a particular waypoint, an alarm signal is generated by the inventive telematics unit 7 and sent to central unit 34. If, for example, at waypoint Frankfurt, the temperature within transport unit 2 is detected to be higher than 25° C., a corresponding alarm signal is sent to the central unit. Unintentional opening of the door during transport also causes a warning signal to be transmitted to the central unit. At each waypoint, telematics unit 7 generates a time stamp, and a warning signal is sent to the central unit if the time stamps are not within the time tolerance range. In a preferred exemplary embodiment, it is, of course, possible to assign priorities to the different messages. For example, the opening of the door may lead to an alarm signal of high priority, whereas a slight exceeding of the temperature threshold value will result in a message of low priority. In the example shown in FIG. 6, transport device 1 initially moves toward waypoint A of the transport schedule. So-called watchboxes are defined by a geographical point and a radius. Entry to and exit from such a geographical area is signaled to central unit 34 by a corresponding message. In the process, a time schedule monitoring function monitors whether transport device 1 reaches the respective watchboxes, or areas, at certain predetermined points in time.

In the example illustrated in FIG. 6, the given transport schedule provides that the vehicle moves from waypoint A to waypoint B via route 2. If the vehicle erroneously takes a different route, for example, via waypoints C and D, telematics unit 7 sends a deviation message to central unit 34. During transport, transport device 1 may send various alarm messages to central unit 34 based on the data acquired by the condition sensors. In the example shown in FIG. 6, an impact alarm indicating a violent impact on transport unit 2 is sent by transport device 1 to central unit 34. In the example shown, shortly before the destination, telematics unit 7 sends a door open alarm to central unit 34, indicating that transport unit 2 has been opened contrary to the transport schedule.

When transport device 1 has reached the destination; i.e., the last waypoint of the transport schedule, an end-of-transport message is sent to central unit 34.

Figure 8:
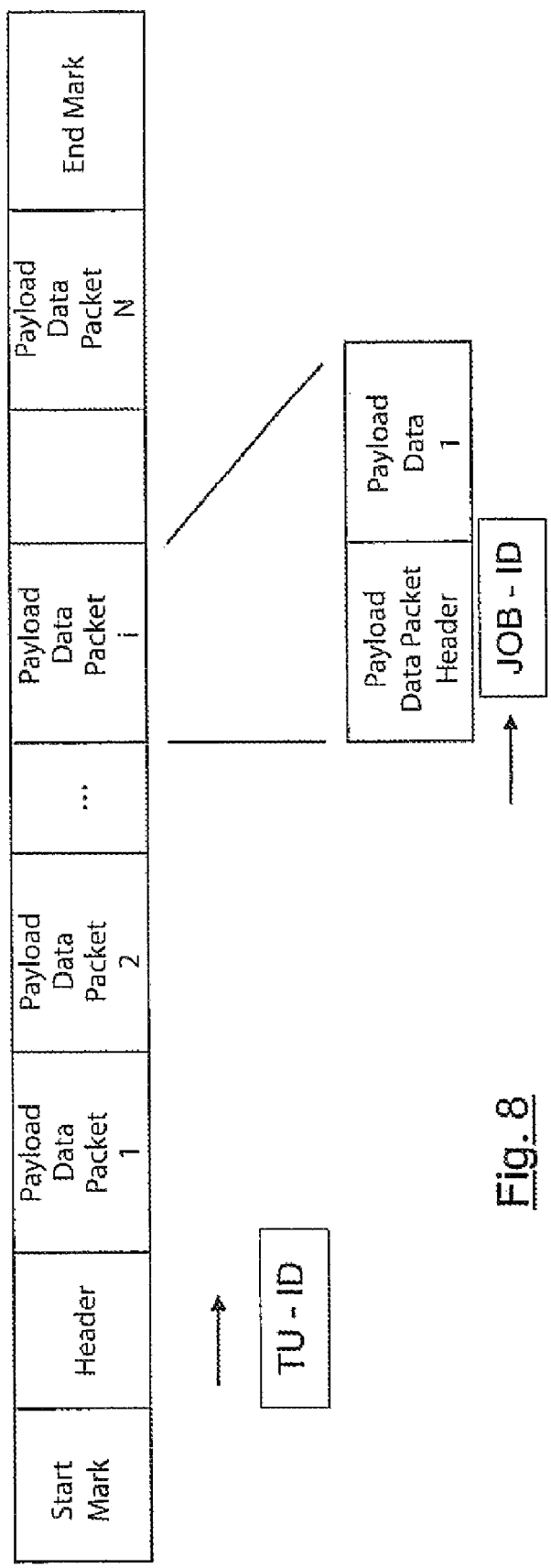
FIG. 8 illustrates the data structure of a message transmitted in the transport monitoring system according to an exemplary embodiment of the present invention.

FIG. 8 shows a possible data structure of the messages exchanged between central unit 34 and transport device 1. The message includes a start mark and an end mark, as well as a header or header data. The header data includes a unique identifier of the sending telematics unit 7 (TU-ID) and, for example, a data field indicating the number N of the payload data packets transmitted in the data frame. For example, each payload data packet may include a waypoint of the transport schedule. For example, at each waypoint, transport device 1 may send to central unit 34 a corresponding payload data packet 1 including the current sensor data, the coordinates, and time data.

In this embodiment, the comparison of such data with the predefined reference transport schedule is performed within central unit 34. In a preferred exemplary embodiment, the comparison between the reference data and the current actual data is done in telematics unit 7, and an alarm signal or alarm message is sent to central unit 34 only when a deviation is detected. This significantly reduces the volume of data sent to central unit 34 from the various transport devices 1. It is only when deviations occur that central unit 34 receives corresponding messages from the various transport devices 1.

Each payload data packet, in turn, includes a header containing corresponding payload data, or payload. The payload data packet header includes a unique identifier indicating the job or process that generates the corresponding message on the terminal. Payload data of different processes may be embedded in a single message. However, the data transfer is optimized by filling a data frame with data of different interrogations. The payload data packets may be arranged in any order in the message or frame. In a preferred exemplary embodiment, newly implemented condition sensors send corresponding payload data packets in order to register to central unit 34 without changing the existing mechanism. This allows versatile expansion. The data transmission frame, such as is illustrated in FIG. 8, can be disassembled and reassembled by specific routines, which facilitates transmission via SMS or GPRS.

The payload data transmitted in the payload data packets may include position data, condition sensor data, time data, but also inventory lists of the goods transported in transport device 1. The messages are transmitted between central unit 34 and transport devices 1 via a predefined data transfer protocol, such as a TDCP data transfer protocol. Preferably, the data transmission between central unit 34 and transport devices 1 is by packets, as is illustrated in FIG. 8. In a preferred embodiment, central unit 34 may also transmit command messages to activate actuators within transport device 1. For example, central unit 34 may send, to transport device 1, a command to lock transport unit 2. In such a case, when telematics unit 7 has received such a command, it activates the locking device and closes door 5 of transport unit 2. This allows, for example, a container to be remotely locked by central unit 34.

By comparing the actual data to the reference data, the central unit can at all times obtain a complete overview of the condition of the goods being transported. The recipients of such goods can constantly be informed of the progress of the transport. A deviation from the transport schedule constitutes a so-called "event", which will cause a deviation message to be generated and sent to central unit 34. Central unit 34 may transmit the driver a message containing proposals for a solution. Preferably, central unit 34 intervenes only if deviations from the transport schedule are detected (management by exception). Event-controlled alerting is carried out in response to all types of safety-critical events, deviations from the planned progression of the transport being reported in real time or close to real time. The contents of all transport units 2 are automatically inventoried. The data transmission between transport devices 1 and central unit 34 is preferably performed by encrypted data transmission.

Figure 9:
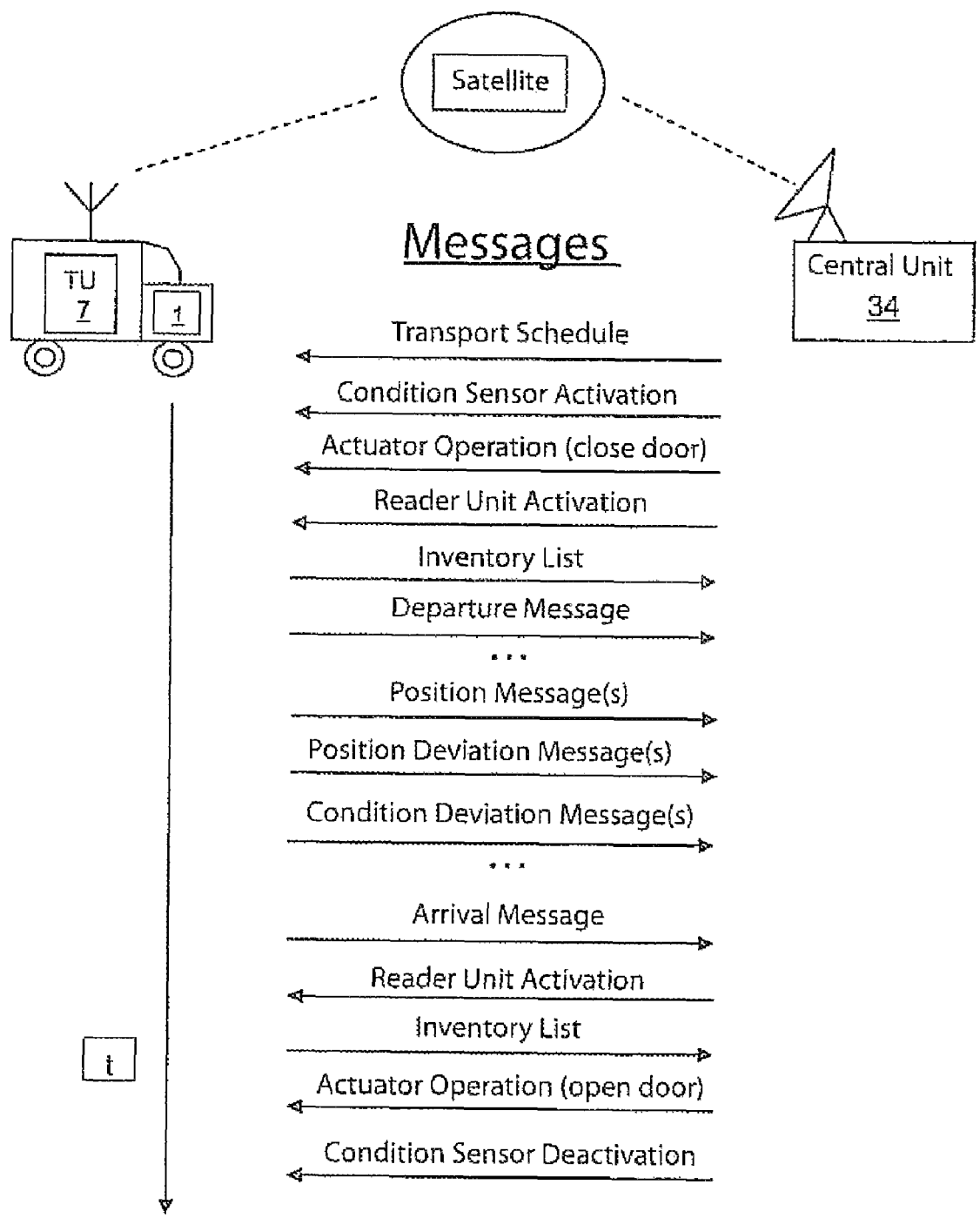
FIG. 9 illustrates the messages exchanged between the central unit and a telematics unit in the transport monitoring system according to an exemplary embodiment of the present invention.

FIG. 9 illustrates the exchange between a telematics unit 7 and a central unit 34 via a wireless link, such as via a satellite. First, central unit 34 sends the predefined transport schedule to telematics unit 7. After that, the condition sensors of transport device 1 are activated. In the example shown in FIG. 9, transport unit 2 is remotely locked by the closing movement of an actuator after central unit 34 has sent a corresponding message to transport device 1. A closed position sensor 6 signals to evaluation unit 9 that transport unit 2 is closed, and an additional reader unit activation signal transmitted by central unit 34 is logically ANDed with the activation signal of closed position sensor 6, whereupon reader unit 8 is activated to emit an interrogation signal into the cargo space. It is not until the activation signal transmitted by closed position sensor 6 and the activation signal sent by central unit 34 are both logically high that reader unit 8 is activated to emit the interrogation signal. The identification data signals returned by tags 4 are evaluated by evaluation unit 9 and assembled into an inventory list. Telematics unit 7 sends the inventory list to central unit 34. For example, after a sensor signals that a certain traveling speed has been exceeded, transport device 1 sends a departure message to central unit 34.

During transport, position messages are sent to central unit 34 at the waypoints or on request. If telematics unit 7 detects a positional deviation from the predefined transport schedule, a position deviation message is sent to central unit 34. Similarly, if evaluation unit 9 detects a condition deviation based on the acquired sensor data, condition deviation messages are sent to central unit 34.

Once transport device 1 reaches the destination, it sends an arrival message to central unit 34. The latter sends, for example, an activation signal for activating reader unit 8, and the identification data signals read and processed are returned by transport device 1 to central unit 34 as an inventory list. The inventory list sent from the place of departure and the inventory list sent at the destination are compared to each other by central unit 34. If the two inventor lists are found to be identical, it is decided that no goods were lost during transport. If, conversely, the inventory list at the destination is found to deviate from the inventory list at the place of departure, this is detected by central unit 34 and may, for example, be signaled to the driver. After receipt of the inventory list at the destination, central unit 34 sends, for example, a message for operating an actuator in transport device 1. For example, the locking mechanism of the door of transport unit 2 is opened. After that, central unit 34 may, for example, deactivate the condition sensors to save energy.

The transport monitoring system according to the present invention monitors the condition in transit fully automatically using contactless sensor technology. A separate mechanism signals deviations from the transport schedule. Such deviations from the transport schedule may trigger predefined actions. The transport monitoring system of the present invention can be flexibly configured for a particular application. Since interrogation signals and corresponding identification data signals are generated during transport only in response to an activation signal, the transport monitoring system of the present invention is secure against tapping and allows the use of active tags 4. In a preferred embodiment, forced opening of the securely closed transport unit 2 is signaled by additional condition sensors. The transport monitoring system according to the present invention is also particularly suited for transporting goods in aircraft, because there are no interfering signals affecting air traffic safety. The goods can be objects of any type, including, in particular, tagged animals. Therefore, the transport monitoring system according to the present invention is particularly well suited, for example, to track livestock transports.

What is claimed is:

1. A transport device for transporting goods, the goods including identification tags that store identification data for identifying the goods, the transport device comprising:
   (a) a closable transport unit configured to receive the goods including the identification tags;
   (b) at least one reader unit configured to, upon receipt of an activation signal for activating the reader unit, emit, into the transport unit, an interrogation signal for reading the identification tags and to receive identification data signals that are then emitted by the identification tags;

(c) an evaluation unit configured to evaluate the identification data signals received by the reader unit; and (d) a plurality of activation units, each activation unit configured to generate the activation signal after a triggering event, wherein the evaluation unit is configured to logically combine the activation signals from the plurality of activation units so as to activate the reader unit.

2. The transport device recited in claim 1, wherein the reader unit has a transmit/receive antenna configured to emit the interrogation signal into the transport unit and configured to receive the identification data signals from the identification tags.

3. The transport device recited in claim 1, wherein the evaluation unit includes at least one interface for wireless data transfer.

4. The transport device recited in claim 3, wherein the activation signal from each of the plurality of activation units is received by a central unit via an interface of the evaluation unit.

5. The transport device recited in claim 1, wherein one of the plurality of activation units is a speed sensor for measuring a traveling speed of the transport device, the activation signal generated when the traveling speed exceeds a settable speed threshold value.

6. The transport device recited in claim 1, wherein one of the plurality of activation units is a load sensor for sensing a load weight of the transport device, the activation signal generated when the load weight exceeds a settable weight threshold value.

7. he transport device recited in claim 1, wherein the transport unit includes a container.

8. The transport device recited in claim 1, wherein the identification tags include active tags having an integral power supply.

9. The transport device recited in claim 1, wherein the identification tags include passive tags without an integral power supply.

10. The transport device recited in claim 1, wherein the identification tags include RFID transponders.

11. The transport device recited in claim 10, wherein the RFID transponders are attached to an article label.

12. The transport device recited in claim 1, further comprising condition sensors configure to determine a condition of the goods in transit and connected to the evaluation unit.

13. The transport device recited in claim 12, wherein the condition sensors include temperature sensors configured to measure the temperature within the transport unit.

14. The transport device recited in claim 12, wherein the condition sensors include speed sensors configured to measure a traveling speed of the transport device.

15. The transport device recited in claim 12, wherein the condition sensors include acceleration sensors configured to measure an acceleration of the transport device.

16. The transport device recited in claim 1, wherein the transport device includes a motor vehicle.

17. The transport device recited in claim 16, wherein the motor vehicle includes condition sensors configured to determine the condition of the goods in transit, the condition sensors connected to the evaluation unit.

18. The transport device recited in claim 17, wherein the condition sensors include tire pressure sensors configured to measure the pressure in tires of the motor vehicle.

19. The transport device recited in claim 1, wherein the evaluation unit includes an interface to the reader unit and a processor configured to process the identification data signals received by the reader unit.

20. The transport device recited in claim 19, wherein the evaluation unit includes additional interfaces configured to connect at least one condition sensor and at least one of the plurality of activation units.

21. The transport device recited in claim 1, wherein the evaluation unit includes a GSM unit configured to exchange messages with a central unit.

22. The transport device recited in claim 1, wherein the evaluation unit includes a Global Positioning System unit configured to determine the position of the transport device.

23. A method for tracking a flow of goods, comprising the steps of:

(a) providing the goods with identification tags storing identification data and configured to identify the goods;

(b) loading a transport unit with the goods;

(c) activating, with at least one of a plurality of activation units, a reader unit so to emit an interrogation signal into the transport unit so as to read the identification data stored in the identification tags, wherein the activating includes logically combining an output signal from each of the plurality of activation units;

(d) receiving, by the reader unit, identification data signals emitted by the read identification tags; and (e) evaluating, by an evaluation unit, the identification data signals received by the reader unit.

24. A transport monitoring system for monitoring at least one flow of goods, the transport monitoring system comprising at least one transport device including:

(a) a closable transport unit configured to receive the goods including identification tags;

(b) at least one reader unit configured to, upon receipt of an activation signal for activating the reader unit, emit, into the transport unit, an interrogation signal for reading the identification tags and to receive identification data signals that are then emitted by the identification tags;

(c) an evaluation unit configured to evaluate the identification data signals received by the reader unit;

(d) a plurality of an activation units, each activation unit configured to generate an activation signal after a triggering event ; and (e) at least one central unit configured to exchange messages with the at least one transport device via an interface; and wherein the evaluation unit is configured to logically combine the activation signals from the plurality of activation units so as to activate the reader unit.

* * * * *